US012572675B2

(12) United States Patent
Goyal et al.

(10) Patent No.: US 12,572,675 B2
(45) Date of Patent: ***Mar. 10, 2026

(54) ACCESSING FILE SYSTEMS IN A VIRTUAL ENVIRONMENT

(71) Applicant: RED HAT, INC., Raleigh, NC (US)

(72) Inventors: Vivek Goyal, Westford, MA (US); Daniel Walsh, Marlborough, MA (US); Huamin Chen, Westboro, MA (US); Mrunal Patel, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 750 days.

This patent is subject to a terminal disclaimer.

(21) Appl. No.: 17/467,902

(22) Filed: Sep. 7, 2021

(65) Prior Publication Data

US 2021/0406388 A1 Dec. 30, 2021

Related U.S. Application Data

(63) Continuation of application No. 15/054,550, filed on Feb. 26, 2016, now Pat. No. 11,132,450.

(51) Int. Cl.
| | |
|---|---|
| *G06F 21/62* | (2013.01) |
| *G06F 9/455* | (2018.01) |
| *G06F 16/188* | (2019.01) |

(52) U.S. Cl.
CPC .............. *G06F 21/62* (2013.01); *G06F 9/455* (2013.01); *G06F 9/45558* (2013.01); *G06F 16/188* (2019.01); *G06F 2009/45562* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 6,289,458 | B1 | 9/2001 | Garg et al. |
| 7,756,832 | B1 | 7/2010 | Mowry et al. |
| 8,478,799 | B2 | 7/2013 | Beaverson et al. |
| 8,533,155 | B2 | 9/2013 | Pinkney et al. |
| 8,996,837 | B1 | 3/2015 | Bono et al. |
| 9,026,495 | B1 | 5/2015 | Lent et al. |
| 9,059,976 | B2 | 6/2015 | Lacapra |

(Continued)

OTHER PUBLICATIONS

Zhang, "Harbomaster: Policy Enforcement for Containers", IEEE (Year: 2015).*

(Continued)

*Primary Examiner* — Wynuel S Aquino
(74) *Attorney, Agent, or Firm* — Kilpatrick Townsend & Stockton LLP

(57) ABSTRACT

An access control engine can enable a host operating system to propagate a private resource of an isolated virtual environment, such as a container, running on the host operating system outside of the isolated virtual environment. The private resource can include, for example, a file system mounted within the isolated virtual environment. The access control engine can receive a command and launch the isolated virtual environment in response to the command. Also, in response to the command, the access control engine can interface with a kernel of the host operating system to configure the isolated virtual environment so that the private resource is accessible outside the isolated virtual environment.

20 Claims, 3 Drawing Sheets

(56) References Cited

U.S. PATENT DOCUMENTS

| | | | | |
|---|---|---|---|---|
| 9,152,776 | B2 | 10/2015 | Aggarwal et al. | |
| 9,170,855 | B2 | 10/2015 | Sheehan et al. | |
| 9,524,214 | B1 * | 12/2016 | Isdal | G06F 11/0748 |
| 9,626,166 | B1 * | 4/2017 | Alewine | G06F 8/63 |
| 9,754,122 | B1 * | 9/2017 | Christopher | G06F 21/6218 |
| 9,804,945 | B1 | 10/2017 | Allen | |
| 2012/0204173 | A1 | 8/2012 | Liu | |
| 2013/0227563 | A1 * | 8/2013 | McGrath | G06F 8/60 |
| | | | | 718/1 |
| 2014/0068274 | A1 * | 3/2014 | Kasatkin | G06F 21/64 |
| | | | | 713/189 |
| 2014/0096270 | A1 | 4/2014 | Beckwith et al. | |
| 2015/0237138 | A1 | 8/2015 | Malina et al. | |
| 2016/0378518 | A1 * | 12/2016 | Antony | G06F 9/5077 |
| | | | | 718/1 |
| 2017/0242871 | A1 | 8/2017 | Kilaru | |
| 2017/0249469 | A1 | 8/2017 | Goyal et al. | |
| 2018/0189109 | A1 * | 7/2018 | Nagai | G06F 9/5072 |

OTHER PUBLICATIONS

Lamourine, "Storage Options for Software Containers", usenix.org (Year: 2015).*

"Run," Downloaded from Internet Feb. 26, 2016, https://docs.docket.com/engine/reference/commandline/run/.

"Allow Controlling the Mount Namespace #10088," 2015, https://github.com/docker/docker/issues/10088.

"The Mine of Information (Nuggets of Programming and Linux)," 2015, http://moi.vonos.net/linux/linux-containers/.

Kerrisk, M., "Namespaces in Operation, Part 4: More on PID Namespaces", LWN. Net, 2013, Available Online at : https://lwn.net/Articles/532748, 13 pages.

Kerrisk, M., "User Namespaces Progress," 2012, https://lwn.net/Articles/528078/.

Mouat, A., "Understanding Volumes in Docket", Container-Solutions, Dec. 9, 2014, , http://container-solutions.com/understanding-volumes-docker/.

Mouat, A., "Using Docker", O'Reilly, Dec. 2015, 11 pages.

* cited by examiner

ACCESSING FILE SYSTEMS IN A VIRTUAL ENVIRONMENT

REFERENCE TO RELATED APPLICATION

This application is a continuation of and claims priority to U.S. patent application Ser. No. 15/054,550, filed on Feb. 26, 2016 and titled "Accessing File Systems In A Virtual Environment," the entirety of which is hereby incorporated by reference herein.

TECHNICAL FIELD

The present disclosure relates generally to computer operating systems. More specifically, but not by way of limitation, this disclosure relates to accessing file systems in a virtual environment.

BACKGROUND

Computers use operating systems to manage system processes and resources. Some operating systems, such as the Linux operating system, include a low-level software component for managing system processes and resources. The low-level software component is called a "kernel." The kernel can provide features, such as namespaces and cgroups, for isolating processes and resources from one another. These features can be used to segregate processes and resources (e.g., memory, CPU processing power, and network resources) into isolated virtual environments called "containers."

An operating system (or, more specifically, an instance of the operating system) can run multiple containers simultaneously. The containers can be configured so that processes and resources in one container are private and inaccessible to another container. This isolation can be useful to, for example, run applications in containers without the applications having access to one another. But the isolation provided by containers can also present challenges in a variety of contexts.

DETAILED DESCRIPTION

Figure 1:
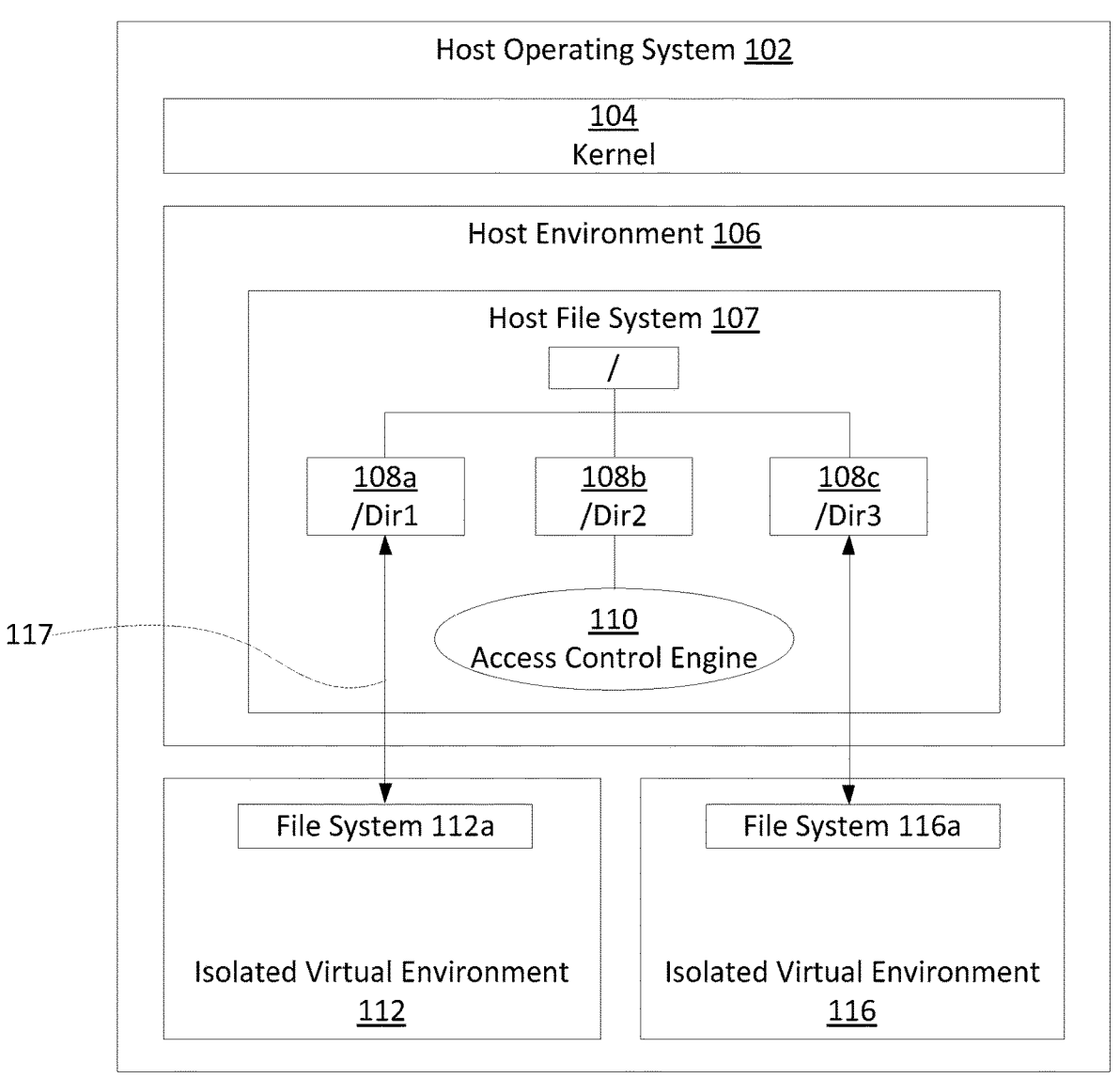
FIG. 1 is a block diagram of an example of a host operating system that includes an access control engine for propagating a file system of an isolated virtual environment outside of the isolated virtual environment according to some aspects.

Certain aspects and features of the present disclosure relate to an access control engine that can enable a host operating system that is running an isolated virtual environment (e.g., a container) to propagate a private resource within the isolated virtual environment to be accessible outside of the isolated virtual environment. An example of the private resource can include a file system mounted within the isolated virtual environment. Propagating the private resource outside of the isolated virtual environment can enable the private resource to be accessed by another isolated virtual environment or by a host environment.

Typically, a host operating system assigns a particular namespace (e.g., grouping of system resources) to an isolated virtual environment. System resources assigned to one namespace may be private and inaccessible to other namespaces. As a result, other virtual environments that do not have access to the namespace of the isolated virtual environment may not have access to the isolated virtual environment's resources. This can limit the flexibility of a computing system. And so it may be desirable in some situations to have a process outside the isolated virtual environment access a private resource of the isolated virtual environment. For example, to add a particular type of file system (e.g., a Gluster or Network File System (NFS) file system) to a host operating system, the host operating system may require use of a particular mount tool located within the isolated virtual environment. But when the host operating system executes the mount tool within the isolated virtual environment, the mount tool executes within the isolated virtual environment, and thus mounts the file system within the isolated virtual environment, not globally. This may be a particular problem with light-weight operating systems, which may have limited default features (e.g., limited file system support) and may instead rely on containerized-applications to provide additional functionality.

Some examples of the present disclosure can allow for expanded resource use by allowing a private resource, such as a file system, of an isolated virtual environment to be accessible outside of the isolated virtual environment. The host environment or another isolated virtual environment can then access the resource. As a particular example, the access control engine can receive a command from a user to launch a container that provides a Gluster file system. The command can include a flag indicating that the container is to be mounted in a "shared" manner. Based on the command, the host operating system (or, more specifically, an instance of the host operating system) can launch the container and create a namespace for the container, but can also allow resources within the namespace to be visible to other namespaces. Thereafter, if the Gluster file system is mounted within the container's namespace, other containers having their own respective namespaces may nevertheless be able to access the mounted Gluster file system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a host operating system 102 that includes an access control engine 110 for propagating a file system 112a of an isolated virtual environment 112 outside of the isolated virtual environment 112 according to some aspects. This can make the file system 112a accessible to a host environment 106, another isolated virtual environment 116, or both.

The access control engine 110 can be a software application. The access control engine 110 can used to propagate the file system 112a from within the isolated virtual environment 112 to outside of the isolated virtual environment 112. In some examples, the access control engine 110 can be a modified version of an existing application, such as Docker™, for creating or launching containers within the host environment 106. Such existing applications typically generate containers that execute in environments that are substantially or completely isolated from one another, from the host environment 106, or both. But, in some examples, such existing applications can be modified to interface with a kernel 104 of the host operating system 102 to propagate the file system 112a from within the isolated virtual environment 112 to outside the isolated virtual environment 112.

The file system 112a can be mounted to a mount point of a host file system 107 of the host environment 106. A mount point can be a directory in the host file system 107 that is accessible by the host operating system 102 and to which an additional file system can be mounted. In the example shown in FIG. 1, the mount point for file system 112a is directory 108a. The mounting of the file system 112a at directory 108a is represented by arrow 117. In some examples, the host file system 107 can include another mount point (e.g., directory 108c) for mounting another file system 116a associated with another isolated virtual environment 116.

The access control engine 110 can be executed to launch the isolated virtual environment 112 (e.g., a container). The access control engine 110 can be executed on any type of host operating system 102 that is compatible with isolated virtual environments 112, 116. For example, the access control engine 110 can be executed on Unix-based operating system or a Linux-based operating system, such as Red Hat™ Linux. The access control engine 110 can receive one or more commands from a user and, based on the commands, launch the isolated virtual environment 112. In some examples, the commands can be received as command-line inputs from a command-line interface of the host operating system 102. In other examples, the commands can be dynamically generated following user input to a graphical user interface (GUI). The user input can include selecting one or more options in the GUI for running a selected container.

The access control engine 110 can additionally or alternatively receive commands from a user indicating that a file system 112a (e.g., at least a portion of the file system 112a) of the isolated virtual environment 112 is to be propagated to outside of the isolated virtual environment 112. The commands can include any number and combination of optional flags. The commands can be received from a user via a command-line interface or via a GUI. For example, the access control engine 110 can receive a command of "softwareApp run –n NEWCONTAINER-shared" via the command-line interface. The flag "–n" can indicate that a new container called "NEWCONTAINER" is to be launched, and the flag "-shared" can indicate that one or more file systems available via the new container "NEWCONTAINER" can be shared with another environment outside the container. In response to receiving the command "softwareApp run –n NEWCONTAINER-shared," the access control engine 110 can launch a new container called NEWCONTAINER and interact with the kernel 104 to allow a file system of the new container to be shared with another environment, such as the host environment 106. As another example, the access control engine 110 can receive a command with a flag "–v <src>:<dest>:shared" via the command-line interface. The "–v" can indicate that the properties "<src>:<dest>:shared" are for a volume of the isolated virtual environment 112, "<src>" can indicate a particular volume to propagate, "<dest>" can indicate a destination (e.g., host environment 106) to which to propagate the particular volume, and "shared" can indicate that the particular volume is to be shared with the destination.

The access control engine 110 can receive any number and combination of flags for controlling how the file system 112a is propagated outside of the isolated virtual environment 112. In response to receiving different flags, the access control engine 100 can propagate the file system 112a according to different propagation methods. Examples of the propagation methods can include a shared propagation method, a recursive shared propagation method, a slave propagation method, a recursive slave propagation method, a private propagation method, and a recursive private propagation method.

The shared propagation method can include propagating at least a portion of the file system 112a of the isolated virtual environment 112 so that a file system that is subsequently mounted within the isolated virtual environment 112 becomes accessible to both the isolated virtual environment 112 and the host environment 106. The recursive shared propagation method can be similar to the shared propagation method, except that the accessibility characteristics of the shared propagation method can also be applied recursively to all other mount points that are under the mounted file system in a file system hierarchy. The slave propagation method can include propagating at least a portion of the file system 112a of the isolated virtual environment 112 so that a file system that is subsequently mounted within the host environment 106 becomes accessible to the isolated virtual environment 112 and to the host environment 106, and a file system mounted within the isolated virtual environment 112 becomes accessible to the isolated virtual environment 112 but not to the host environment 106. The recursive slave propagation method can be similar to the slave propagation method, except that the accessibility characteristics of the slave propagation method can also be recursively applied to all other mount points under the mounted file system in a file system hierarchy. The private propagation method can include propagating at least a portion of the file system 112a of the isolated virtual environment 112 so that a file system that is subsequently mounted within the isolated virtual environment 112 becomes accessible to the isolated virtual environment 112 but not to the host environment 106, and a file system mounted within the host environment 106 becomes accessible to the host environment 106 but not to the isolated virtual environment 112. The recursive private propagation method can be similar to the private propagation method, except that the accessibility characteristics of the private propagation method can also be recursively applied to all other mount points under the mounted file system in the file system hierarchy. Other propagation methods and characteristics are also possible.

The access control engine 110 can cause the file system 112a to be propagated outside of a namespace (e.g., a mount namespace, a UNIX Timesharing System (UTS) namespace, an interprocess communication (IPC) namespace, a process identification (PID) namespace, a network namespace, or a user namespace) of the isolated virtual environment 112 by interfacing with the kernel 104. Particularly, the access control engine 110 can transmit commands to the kernel, or otherwise interact with the kernel, to modify parameters associated with the isolated virtual environment 112. For example, the access control engine 110 can communicate with the kernel 104 to modify a namespace parameter, a cgroup parameter, or both associated with the isolated virtual environment 112.

The particular parameters modified, how they are modified, or both can be determined based on a propagation method. For example, the access control engine 110 can map a propagation method to a particular value for a parameter using a lookup table. Additionally or alternatively, the access control engine 110 may determine a value for a parameter using an algorithm. For example, the access control engine 110 can select an algorithm to use from among multiple available algorithms based on the propagation method. The access control engine 110 can then use the algorithm to determine the value for a parameter. The access control engine 110 can then transmit a command to the kernel 104 to cause the kernel 104 to modify the parameter to the appropriate value to effectuate the propagation method.

In some examples, the file system 112a of the isolated virtual environment's namespace can be propagated into the host file system 107 of the host environment's namespace. Once the file system 112a is propagated into the host file system 107 of the host environment's namespace, the host environment 106 can access the file system 112a. Further, once the file system 112a is propagated into the host file system 107 of the host environment's namespace, other virtual environments may be able to access the file system 112a. For example, file systems that are subordinate to the host file system 107 in a file system hierarchy may be able to access the host file system 107. This may be a default setting of the host operating system 102 (e.g., if the host operating system 102 is a Linux-based operating system). As shown in FIG. 1, the file system 116a of the isolated virtual environment 116 is subordinate to the host file system 107 in the file system hierarchy, because the file system 116a of the isolated virtual environment 116 is mounted to directory 108c of the host file system 107. Thus, the isolated virtual environment 116 may be able to access the host file system 107 and any content publicly mounted to the host file system 107, including the file system 112a of the other isolated virtual environment 112.

In some examples, the isolated virtual environment 112 includes, or may be, a container. A container can be a light-weight virtual environment that can share the kernel 104 with other containers. Some containers can include an instance of the host operating system 102, another operating system, or an application. If multiple containers are running on a single computer, the kernel 104 can dynamically allocate system resources among multiple containers as needed by the containers.

In other examples, the isolated virtual environment 112 includes, or may be, a virtual machine. Some kinds of virtual machines require their own dedicated kernel. Thus, to run multiple of such virtual machines, the host operating system 102 would need multiple kernels. Other virtual machines can share a single kernel 104, but such virtual machines can be allocated a static amount of system resources by the kernel 104, independent of the actual need of the virtual machine. These kinds of virtual machines may not be as efficient with system resources as containers. Still other virtual machines may emulate hardware of a computer on top of the host operating system 102, and then run another instance of the host operating system 102 in the emulation. This may require substantially more system resources than containers. Still, examples of the present disclosure are not limited to containers and may be implemented using any type of isolated virtual environment. Thus, in different examples, a file system mounted within one type of isolated virtual environment may be shared with another isolated virtual environment of the same type or a different type.

Figure 2:
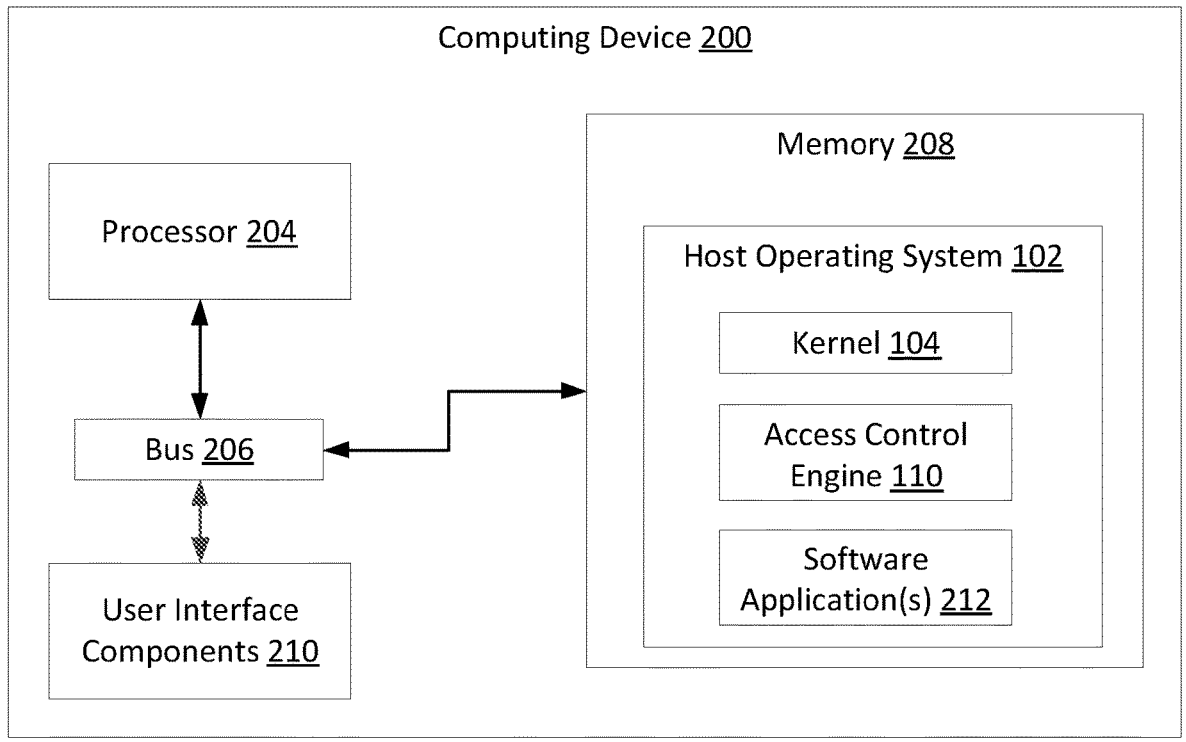
FIG. 2 is a block diagram of a computing device that includes the access control engine of FIG. 1 according to some aspects.

FIG. 2 is a block diagram of a computing device 200 that includes the access control engine 110 of FIG. 1 according to some aspects. The computing device 200 can include a processor 204, a memory 208, and a bus 206. In some examples, the components shown in FIG. 2 (e.g., the processor 204, the bus 206, the user interface components 210, and the memory 208) can be integrated into a single structure. For example, the components can be within a single housing. In other examples, the components shown in FIG. 2 can be distributed (e.g., in separate housings) and in electrical communication with each other.

The processor 204 can execute one or more operations for accessing file systems in a virtual environment. The processor 204 can execute instructions stored in the memory 208 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 208 via the bus 206. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The memory 208 can include program code for the host operating system 102. The host operating system 102 can include program code for the kernel 104, the access control engine 110, or both. Alternatively, the access control engine 110 can be stored in memory 208 separately from the program code for the host operating system 102.

The access control engine 110 can interface with the kernel 104 to cause the kernel 104 to modify a value of a location in memory 208. For example, the access control engine 110 can cause the kernel 104 to modify a value in a location in memory 208 associated with a namespace or other feature of an isolated virtual environment. Modifying the value in the location in memory 208 can enable a private resource within the isolated virtual environment to be accessible outside of the isolated virtual environment.

In some examples, the access control engine 110, the kernel 104, or both can interact with other software applications 212 stored in memory 208 to enable one or more features of the present disclosure. For example, the access control engine 110 can interface with a virtual-environment application stored in memory 208 for launching an isolated virtual environment within a host environment of the host operating system 102. The access control engine 110 can also interface with the kernel 104 to configure one or more characteristics of the isolated virtual environment, such as an accessibility characteristic of the isolated virtual environment. The memory 208 can include any number and combination of applications, engines, modules, or other program code for enabling one or more features of the present disclosure.

The user interface components 210 can facilitate connection to user interface devices such as one or more displays, touch sensitive surfaces, keyboards, mice, speakers, microphones, buttons, or other hardware used to input data or output data.

Figure 3:
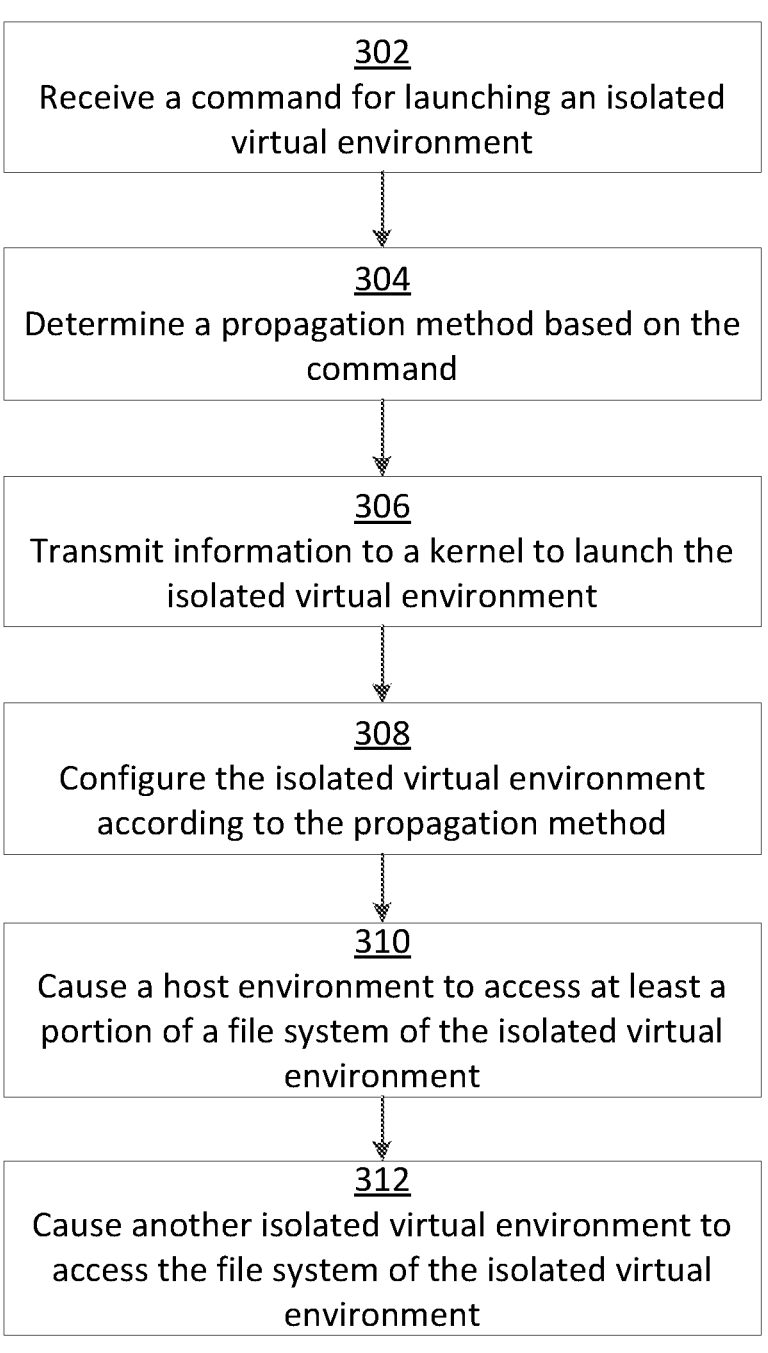
FIG. 3 is a flow chart showing an example of a process for using the access control engine to propagate a file system from within an isolated virtual environment to outside of the isolated virtual environment according to some aspects.

FIG. 3 is a flow chart showing an example of a process for using the access control engine to propagate a file system from within an isolated virtual environment to outside of the isolated virtual environment according to some aspects. Some examples can include more, fewer, or different steps than the steps depicted in FIG. 3. The steps below are described with reference to components described above with regard to FIG. 1.

In block 302, an access control engine 110 can receive a command for launching an isolated virtual environment 112. The access control engine 110 can receive the command via a GUI or a command-line interface.

In some examples, a flag can indicate a particular propagation method to be used to propagate a file system 112a of the isolated virtual environment 112 outside of the isolated virtual environment 112. For example, the flag can indicate that any of the propagation methods described above is to be used to propagate the file system 112a outside of the isolated virtual environment 112.

In some examples, a flag can indicate a time period for which a particular propagation method is to be applied. For example, a user may wish to have the file system 112a of the isolated virtual environment 112 propagated according to the shared propagation method for one hour, or another limited duration. The access control engine 110 can receive a flag or series of flags, such as "-shared-limited_duration 1," by user input. Based on the flag or flags, the access control engine 110 can propagate the file system 112a according to the shared propagation method. After one hour elapses, the access control engine 110 can propagate the file system 112a using a default propagation method, such as private propagation method. Alternatively, the user may specify a propagation method for the access control engine 110 to apply after the limited duration elapses. For example, the access control engine 110 can receive a flag or series of flags, such as "-shared-limited_duration 1.2-slave," by user input. Based on the flags, the access control engine 110 can propagate the file system 112a according to the shared propagation method and, after a time period of 1.2 hours elapses, propagate the file system 112a using the slave propagation method. Any number and combination of flags can be used to cause the access control engine 110 to apply any number of propagation methods to the file system 112a at customizable time intervals.

In some examples, a flag can indicate a part of a file system 112a, such as a particular subdirectory, to which to apply a particular propagation method. For example, the access control engine 110 can receive a flag or series of flags, such as "-shared/dirName," by user input. Based on the flag or flags, the access control engine 110 can propagate the directory "dirName" of file system 112a according to the shared propagation.

In some examples, a flag can indicate a particular user account or namespace to which to grant access to the file system 112a. For example, the access control engine 110 can receive a flag or series of flags, such as "-shared-access root," by user input. Based on the flag or flags, the access control engine 110 can propagate the file system 112a according to the shared propagation method and so that the file system 112a is only accessible to a root user. As another example, the access control engine 110 can receive a flag or series of flags, such as "-shared-access rhat," by user input. Based on the flag or flags, the access control engine 110 can propagate the file system 112a according to the shared propagation method and so that the file system 112a is only accessible to a user named "rhat." Flags can be used to indicate any combination of access requirements and restrictions.

In some examples, a flag can indicate a particular system resource to propagation outside of the isolated virtual environment 112. For example, the user may wish to propagate a particular process executing within the isolated virtual environment 112 outside of the isolated virtual environment 112. The process may have a process name of "Process_1." The access control engine 110 can receive a flag or series of flags, such as "-shared-process Process_1," by user input to effectuate the propagation. Based on the flag or flags, the access control engine 110 can propagate the process "Process_1" outside of the isolated virtual environment 112.

In some examples, a flag can indicate a particular type of isolated virtual environment 112 to launch. For example, a flag of "-container" can cause the access control engine 110 to launch a container. A flag of "vmachine-hardware" can cause the access control engine 110 to launch a virtual machine with hardware emulation. A flag of "vmachine-static" can cause the access control engine 110 to launch a virtual machine in which system resources are statically allocated.

In block 304, the access control engine 110 can determine a propagation method based on the command. For example, the access control engine 110 can map a flag included in the command to a particular propagation method via a lookup table. In one such example, the access control engine 110 can map a flag of "shared" to a shared propagation method. The access control engine 110 can map a flag of "r-shared" to a recursive-shared propagation method. The access control engine 110 can map a flag of "slave" to a slave propagation method. The access control engine 110 can map a flag of "r-slave" to a recursive-slave propagation method. The access control engine 110 can map a flag of "private" to a private propagation method. The access control engine 110 can map a flag of "r-private" to a recursive-slave propagation method.

The access control engine 110 can additionally or alternatively determine other characteristics of the isolated virtual environment 112 based on the command. For example, based on one or more flags included in the command, the access control engine 110 can determine a time period for which to apply the propagation method, a part of a file system 112a (e.g., a particular directory) to which to apply the propagation method, a system resource to which to apply the propagation method, an access limitation, a particular type of isolated virtual environment 112 to launch, or any combination of these.

In block 306, the access control engine 110 can transmit information to a kernel 104 of a host operating system 102 to launch the isolated virtual environment 112. For example, the access control engine 110 can transmit one or more commands to, or otherwise interface with, the kernel 104 to cause the kernel 104 to launch the isolated virtual environment 112. The commands can cause the kernel 104 to generate (or register) a namespace, cgroup, or both for the isolated virtual environment 112 to launch the isolated virtual environment 112.

In some examples, the commands can cause the kernel 104 to launch a particular type of isolated virtual environment 112, such as a container or virtual machine. For example, the commands may cause the kernel 104 to execute additional software to launch a virtual machine with emulated computer hardware.

In block 308, the access control engine 110 can configure the isolated virtual environment 112 according to the propagation method. For example, the access control engine 110 can transmit one or more commands to, or otherwise interface with, the kernel 104 to cause the kernel 104 to configure the isolated virtual environment 112 according to the propagation method. In one such example, the access control engine 110 may transmit a command to the kernel 104 to cause the kernel 104 to propagate a mount namespace of the isolated virtual environment 112 to another environment, such as the host environment 106 or the isolated virtual environment 116.

As particular examples, a file system 112*a* to be mounted can include a top-level directory and two subdirectories. To mount the file system 112*a* according to the shared propagation method, the access control engine 110 can cause the kernel 104 to apply the accessibility characteristics of the shared propagation method to the top-level directory, but not the two subdirectories. To mount the file system 112*a* according to the recursive shared propagation method, the access control engine 110 can cause the kernel 104 to apply the accessibility characteristics of the shared propagation method to the top-level directory, as well as the two subdirectories. For example, the access control engine 110 can cause the kernel 104 to apply the accessibility characteristics of the shared propagation method to the top-level directory. Then, the access control engine 110 can step through each of the subdirectories, causing the kernel 104 to apply the accessibility characteristics of the shared propagation method to each of the subdirectories. The access control engine 110 can iterate this process until the accessibility characteristics of the shared propagation method have been applied to all of the directories in the file system 112*a*.

In some examples, to mount the file system 112*a* according to the slave propagation method, the access control engine 110 can cause the kernel 104 to apply the accessibility characteristics of the slave propagation method to the top-level directory, but not the two subdirectories. To mount the file system 112*a* according to the recursive slave propagation method, the access control engine 110 can cause the kernel 104 to apply the accessibility characteristics of the slave propagation method to the top-level directory, as well as the two subdirectories (e.g., in the manner described above with respect to the recursive shared propagation method).

In some examples, to mount the file system 112*a* according to the private propagation method, the access control engine 110 can cause the kernel 104 to apply the accessibility characteristics of the private propagation method to the top-level directory, but not the two subdirectories. To mount the file system 112*a* according to the recursive private propagation method, the access control engine 110 can cause the kernel 104 to apply the accessibility characteristics of the private propagation method to the top-level directory, as well as the two subdirectories (e.g., in the manner described above with respect to the recursive shared propagation method).

Additionally or alternatively, the access control engine 110 can configure the isolated virtual environment 112 according to other user-input commands or flags. For example, the access control engine 110 can propagate a particular process outside the isolated virtual environment 112 by causing a PID namespace associated with the process to be shared with other environments. As another example, the access control engine can configured the isolated virtual environment 112 according to a particular propagation method for a limited time period by initiating a counter or monitoring a system clock. In response the time period elapsing, the access control engine 110 can transmit commands to the kernel 104 to change the propagation method.

In block 310, a host environment 106 can access at least a portion of a file system 112*a* of the isolated virtual environment 112. For example, the host operating system 102 can receive user input via a user interface device for selecting, executing, or otherwise interacting with a component of the file system 112*a*. The user interface device can include a mouse, keyboard, or touch-sensitive surface. The component of the file system 112*a* can include a file, directory, application (e.g., a mount tool for mounting a directory to a file system, such as host file system 107), or any combination of these. In response to the user input, the host operating system 102 can cause the host environment 106 to select, execute, or otherwise interact with the component of the file system 112*a*.

In block 312, another isolated virtual environment 116 can access the file system 112*a* of the isolated virtual environment 112. For example, the isolated virtual environment 116 can receive user input via a user interface device for interacting with a component of the file system 112*a*. Based on the user input, the isolated virtual environment 116 can interact with a component of the file system 112*a*.

For example, a GUI representation of the isolated virtual environment 116 may be output on a display. A user can interact with the GUI to navigate through one or more file systems. For example, the GUI can receive user input from a user interface device, such as a mouse or keyboard, associated with navigating through the host file system 107. The host file system 107 may be navigated until a top-level directory of the file system 112*a* is reached. Thereafter, the GUI may receive user input associated with selecting the top-level directory. In response to the top-level directory being selected, the isolated virtual environment 116 may access files, subdirectories, or other content within the top-level directory and cause this content to be displayed within the GUI. The GUI may then receive user input associated with navigating the file system 112*a* until the application is reached. Thereafter, the GUI may receive a user input associated with the application being selected. In response to the application being selected, the isolated virtual environment 116 may initiate one or more processes, interface with the kernel 104 or host operating system 102, or both to execute the application.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium comprising program code that is executable by a processing device for causing the processing device to:

launch a container in a host environment by:

initializing a volume for the container in the host environment; and executing an engine to configure the container in accordance with a selected propagation method for a file system of the container, wherein the selected propagation method is selected from among a plurality of propagation methods preprogrammed into the engine for controlling file system sharing between the container and the host environment, wherein the engine configures the container in accordance with the selected propagation method by transmitting one or more commands to a kernel of an operating system of the host environment, the one or more commands being configured to cause the kernel to modify a property of a namespace of the container based on the selected propagation method; and based on the property of the namespace being modified by the kernel, execute a mount tool located within the file system in the container for mounting a directory in the namespace such that the directory is accessible to a host file system of the host environment.

2. The non-transitory computer-readable medium of claim 1, wherein the plurality of propagation methods preprogrammed into the engine include a first propagation method configured to allow the host environment to access the file system of the container and to prevent the container from accessing the host file system of the host environment, a second propagation method configured to allow the host environment to access the file system of the container and to allow the container to access the host file system of the host environment, a third propagation method configured to prevent the host environment from accessing the file system of the container and to allow the container to access the host file system of the host environment, and a fourth propagation method configured to prevent the host environment from accessing the file system of the container and to prevent the container from accessing the host file system of the host environment.

3. The non-transitory computer-readable medium of claim 1, further comprising program code that is executable by the processing device for causing the processing device to:

receive a command that includes a flag indicating the selected propagation method; and in response to receiving the command, launch the container in the host environment in accordance with the selected propagation method.

4. The non-transitory computer-readable medium of claim 1, further comprising program code that is executable by the processing device for causing the processing device to initialize the volume prior to configuring the container based on the selected propagation method.

5. The non-transitory computer-readable medium of claim 1, wherein the container is a first container and the file system is a first file system, and further comprising program code that is executable by the processing device for causing the processing device to:

launch a second container comprising a second file system; and configure the first container and the second container according to different propagation methods of the plurality of propagation methods, such that the second container can access the first file system of the first container but the first container cannot access the second file system of the second container.

6. The non-transitory computer-readable medium of claim 1, wherein each propagation method among the plurality of propagation methods is for configuring the host environment and the container to have a different set of access permissions in relation to the file system and the host file system than the other propagation methods in the plurality of propagation methods.

7. The non-transitory computer-readable medium of claim 1, further comprising program code that is executable by the processing device for causing the processing device to:

mount the file system within the container subsequent to the container being launched; and subsequent to mounting the file system within the container, access the mount tool in the file system to mount the directory.

8. A computer-implemented method comprising:

launching a container in a host environment by:

initializing a volume for the container in the host environment; and executing an engine to configure the container in accordance with a selected propagation method for a file system of the container, wherein the selected propagation method is selected from among a plurality of propagation methods preprogrammed into the engine for controlling file system sharing between the container and the host environment, wherein the engine configures the container in accordance with the selected propagation method by transmitting one or more commands to a kernel of an operating system of the host environment, the one or more commands being configured to cause the kernel to modify a property of a namespace of the container based on the selected propagation method; and based on the property of the namespace being modified by the kernel, executing a mount tool located within the file system in the container for mounting a directory in the namespace such that the directory is accessible to a host file system of the host environment.

9. The method of claim 8, wherein the plurality of propagation methods preprogrammed into the engine include a first propagation method configured to allow the host environment to access the file system of the container and to prevent the container from accessing the host file system of the host environment, a second propagation method configured to allow the host environment to access the file system of the container and to allow the container to access the host file system of the host environment, and a third propagation method configured to prevent the host environment from accessing the file system of the container.

10. The method of claim 8, further comprising:

receiving a command that includes a flag indicating the selected propagation method; and in response to receiving the command, launching the container in the host environment in accordance with the selected propagation method.

11. The method of claim 8, wherein initializing the volume is distinct from configuring the container based on the selected propagation method.

12. The method of claim 8, wherein the container is a first container and the file system is a first file system, and further comprising:

launching a second container comprising a second file system; and configure the first container and the second container according to different propagation methods of the plurality of propagation methods, such that the second container can access the first file system of the first container but the first container cannot access the second file system of the second container.

13. The method of claim 8, wherein each propagation method among the plurality of propagation methods is for configuring the host environment and the container to have a different set of access permissions in relation to the file system and the host file system than the other propagation methods in the plurality of propagation methods.

14. The method of claim 8, further comprising:

mounting the file system within the container subsequent to the container being launched; and

subsequent to mounting the file system within the container, accessing the mount tool in the file system to mount the directory.

15. A system comprising:

a processing device; and a memory device including instructions that are executable by the processing device for causing the processing device to:

launch a container in a host environment, wherein launching the container involves executing an engine to configure the container based on a selected propagation method for a file system of the container, wherein the selected propagation method is selected from among a plurality of propagation methods preprogrammed into the engine for controlling file system sharing between the container and the host environment, and wherein the engine configures the container in accordance with the selected propagation method by transmitting one or more commands to a kernel of an operating system of the host environment, the one or more commands being configured to cause the kernel to modify a property of a namespace of the container based on the selected propagation method; and based on the property of the namespace being modified by the kernel, execute a mount tool located within the file system in the container for mounting a directory in the namespace such that the directory is accessible to a host file system of the host environment.

16. The system of claim 15, wherein the plurality of propagation methods preprogrammed into the engine include a first propagation method configured to allow the host environment to access the file system of the container and to allow the container to access the host file system of the host environment, and a second propagation method configured to prevent the host environment from accessing the file system of the container and to allow the container to access the host file system of the host environment.

17. The system of claim 15, wherein the memory device further includes instructions that are executable by the processing device for causing the processing device to:

receive a command that includes a flag indicating the selected propagation method; and in response to receiving the command, launch the container in the host environment in accordance with the selected propagation method.

18. The system of claim 15, wherein the container is a first container and the file system is a first file system, and wherein the memory device further includes instructions that are executable by the processing device for causing the processing device to:

launch a second container comprising a second file system; and configure the first container and the second container according to different propagation methods of the plurality of propagation methods, such that the second container can access the first file system of the first container but the first container cannot access the second file system of the second container.

19. The system of claim 15, wherein each propagation method among the plurality of propagation methods is for configuring the host environment and the container to have a different set of access permissions in relation to the file system and the host file system than the other propagation methods in the plurality of propagation methods.

20. The system of claim 15, wherein the memory device further includes instructions that are executable by the processing device for causing the processing device to:

mount the file system within the container subsequent to the container being launched; and subsequent to mounting the file system within the container, operate the mount tool, which is located in the file system of the container, to mount the directory.

* * * * *